United States Patent [19]

Thompson et al.

[11] 3,808,566

[45] Apr. 30, 1974

[54] SWITCHING SYSTEM

[75] Inventors: Russell G. Thompson; Eric R. Woods, both of San Diego; David J. Frye, La Mesa, all of Calif.

[73] Assignee: General Dynamics Corporation, St. Louis, Mo.

[22] Filed: May 24, 1973

[21] Appl. No.: 363,782

[52] U.S. Cl. .......... 335/152, 317/101 DA, 335/112, 333/84 M

[51] Int. Cl. .......................................... H01h 67/30

[58] Field of Search ........... 340/166 S; 317/101 DH; 335/152, 151, 153, 154, 112; 333/84 M

[56] References Cited

UNITED STATES PATENTS

| | | | |
|---|---|---|---|
| 3,651,432 | 3/1972 | Henschen et al. | 317/101 DH |
| 3,582,844 | 6/1971 | Launt | 335/112 |
| 3,408,602 | 10/1968 | McHorter | 335/152 |

*Primary Examiner*—David Smith, Jr.
*Attorney, Agent, or Firm*—Martin LuKacher, Esq.

[57] ABSTRACT

A broadband matrix switching system switches a plurality of output loads to any of a plurality of input signal sources. Modular printed circuit cards which carry cross-point switches and transmission lines are mounted on a motherboard; an input distribution card being provided for each input to the matrix switching system and an output selection card being provided for each output. The input distribution cards have distribution networks and low capacitance cross-point switching cells which provide selective connections to all of the output select cards via transmission lines on the input transmission lines and other transmission lines carried by the motherboard. The input distribution card further provides a termination which is of value equal to the characteristic impedance of each input signal source. The switches on the input cards connect each output of the input distribution cards to either an output select card or a dummy load resistor which is of value equal to the characteristic impedance. Through the use of signal carrying lines of the same length and the cross-point switches located in accordance with a geometry which standardizes the path lengths to the cards, the effects of any mismatched impedances are minimized to thereby provide for improved frequency response characteristics, constant propagation delays, reduced voltage standing wave ratio, and improved cross-talk characteristics.

14 Claims, 13 Drawing Figures

SWITCHING SYSTEM

The present invention relates to switching systems and particularly to an improved matrix switching system capable of handling signals over a broad band of frequencies.

The invention is especially suitable for use in systems for switching signals which have components extending from DC (direct current) to ultra high frequencies, say 500 MHz, and especially where an input is to be switched to any one or all of a plurality of outputs with unlimited paralleling. The invention is also applicable in providing other forms of matrix switches especially where high frequency signals are to be switched.

With the advent of new multiplexing techniques and with the requirement for transmission of data signals, the need has arisen for switching systems capable of handling extremely broad band signals. While previous baseband switching systems could accommodate signals having up to about 40 MHz band widths, the new communication technology has established requirements for switching signals with band widths extending from DC to hundreds of megacycles. At such high frequencies, known types of switching systems load and attenuate the signals severely. An even more troublesome problem is that the signal paths through known switching systems interpose variable phase shifts and propagation delays; thus, when an input is switched to a plurality of outputs in parallel, the signal is not in phase at each of the outputs and the phase shift at the different outputs may vary nonlinearly with frequency. Moreover, known switch systems exhibit unwanted crosstalk between the circuits established in the switch.

In attempts to overcome some of these problems, impedance transformation networks have been used at the input to the switching systems to reduce loading at high frequency. Such networks increase the cost of the switching system by requiring additional gain at the switching system outputs. The impedance transformation networks which are known, are also not sufficiently broad banded to operate over the extremely wide ranges necessitated by new communication techniques, say D.C. to 500 MHz.

Accordingly, it is an object of the present invention to provide an improved switching system.

It is a still further object of the present invention to provide an improved broad band matrix switching system capable of handling signals having frequencies up to and including several hundred megacycles.

It is a still further object of the present invention to provide an improved broadband matrix switching system for connecting one or more outputs in parallel into any switch input wherein cross talk between switch paths is reduced.

It is a still further object of the present invention to provide an improved broadband matrix switching system which obtains broadband operation without need for impedance transformation networks.

It is a still further object of the present invention to provide an improved broadband switching system which has a low voltage standing wave ratio (VSWR) when handling high frequency signals, thus reducing loading effects and distortion of such signals during switching.

It is a still further object of the present invention to provide an improved broadband switching system which does not interpose variable phase shifts, or propagation delay distortion upon signals switched therein.

Briefly described, a switching system embodying the invention is operative to selectively extend a plurality of circuit paths for signals having frequencies ranging from D.C. to ultra high frequency between a plurality of inputs and a plurality of outputs.

Switch devices are preferably provided in the form of cross points which present low capacitance by minimal coupling between the switch contacts and their respective switch operating elements. The switches are mounted on a plurality of input printed circuit cards and another plurality of output selection printed circuit cards. Each of the cards includes a plurality of printed circuit transmission lines which present a certain characteristic impedance equal to the characteristic impedance of the signal sources connected to the various inputs. The input distribution cards and the output selection cards are interconnected by transmission lines on a board on which the cards are mounted. These lines also present the characteristic impedance. Unwanted couplings which could result in cross talk between switching circuit paths are minimized by arranging the switchs in symmetrical arrays which also facilitate the use of equal transmission line lengths between inputs and outputs, no matter which inputs and outputs are interconnected. The switching system thus presents the characteristic impedance and constant propagation delay throughout; thus, reducing VSWR and its consequent unwanted attenuation and delay distortion of the signals.

The foregoing and other objects and advantages of the invention and the invention itself will become more readily apparent from a reading of the following description in connection with the accompanying drawings in which.

Figure 1:
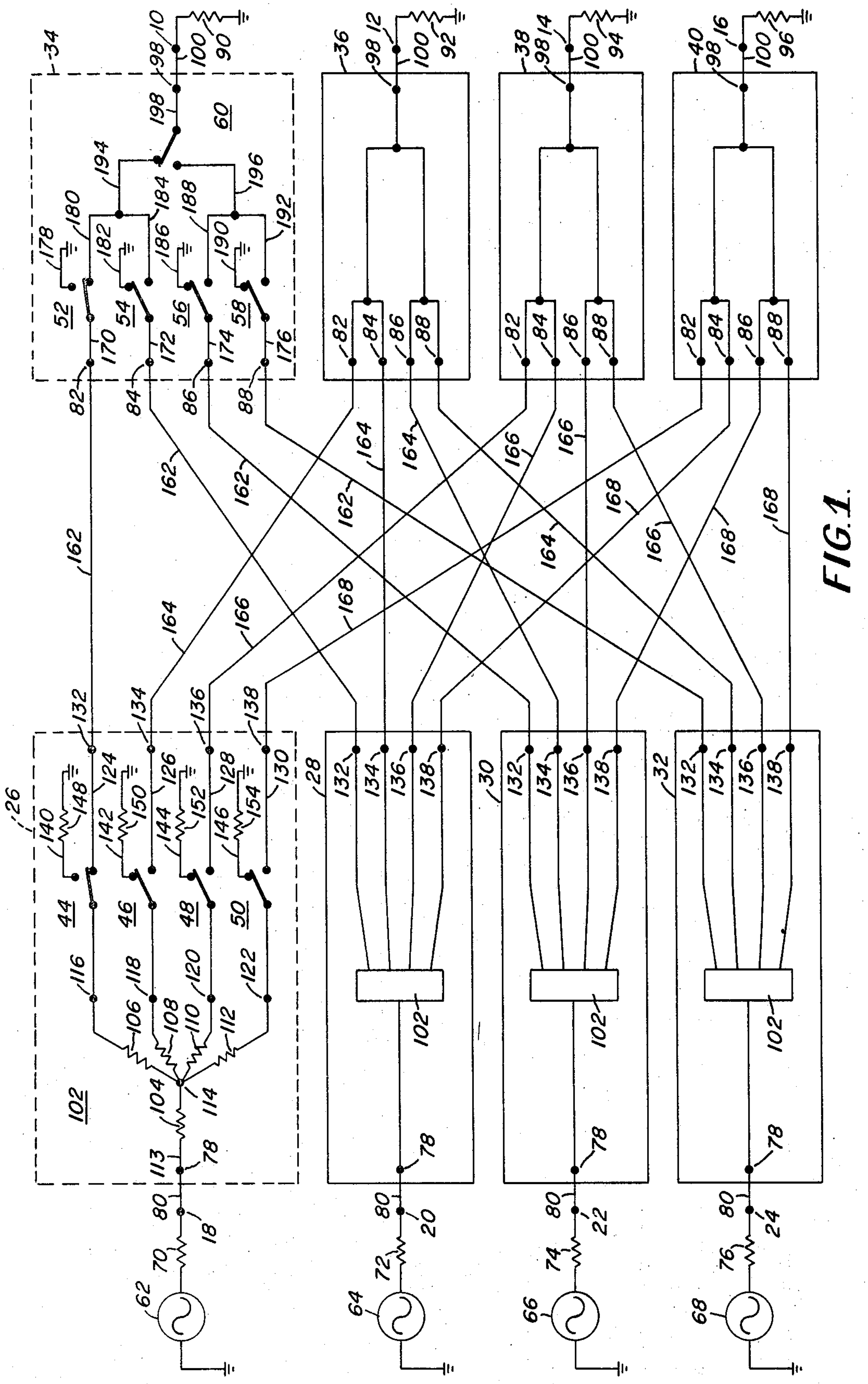
FIG. 1 is a schematic diagram of a broadband matrix switching system embodying the invention.
Figures 4, 5, 6, 7, 8:
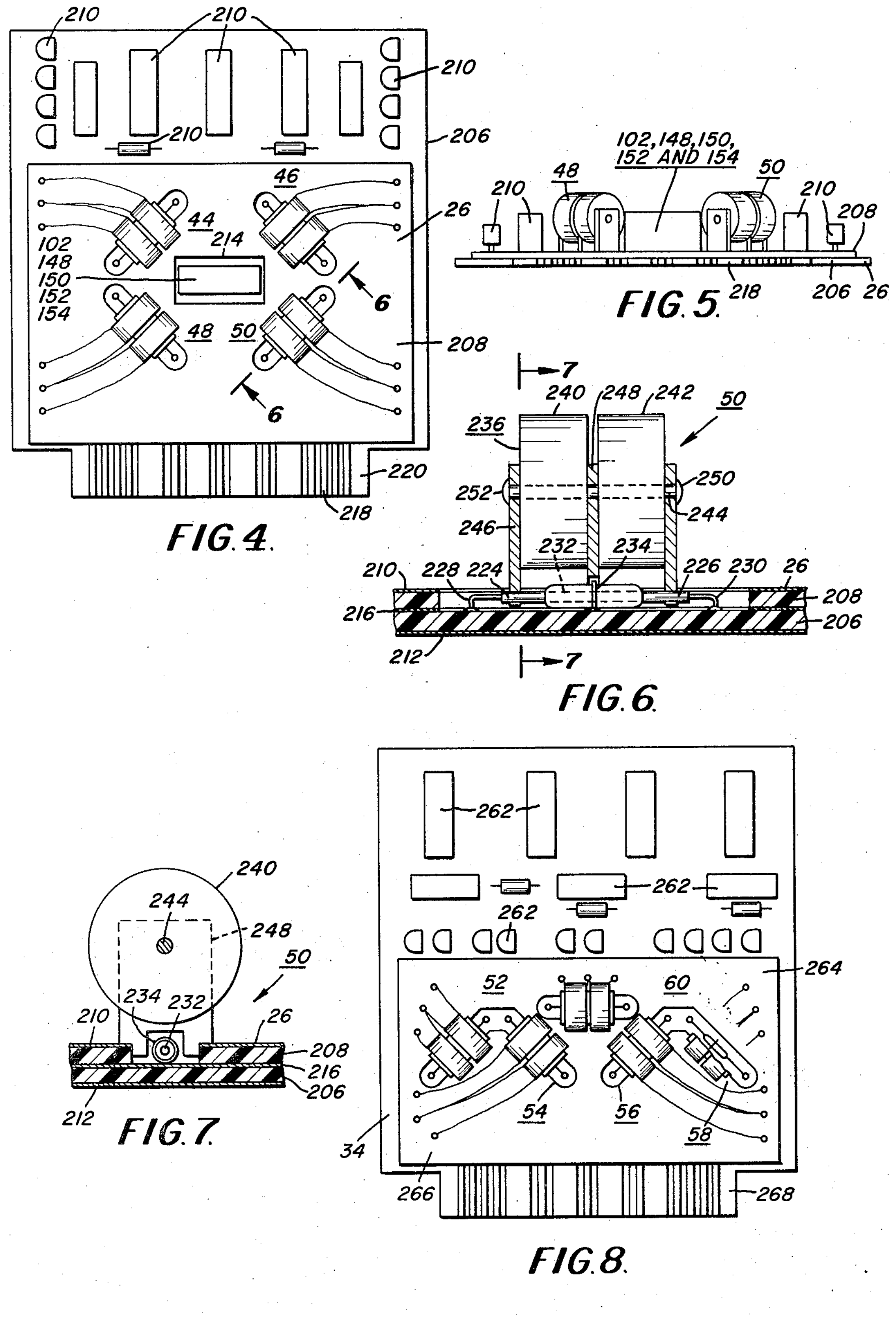
FIG. 4 is a plan view of one of the input distribution cards shown in FIG. 1.
FIG. 5 is an end view of the card shown in FIG. 4.
FIG. 6 is a fragmentary sectional view taken along the lines 6—6 in FIG. 4, showing the switch devices used on the input distribution card shown in FIGS. 4 and 5, and the connections thereof to transmission line paths provided in the card.
FIG. 7 is a sectional view taken along the line 7—7 in FIG. 6.
FIG. 8 is a plan view of one of the output selection cards used in the switching system illustrated in FIG. 1.

Referring more particularly to FIG. 1, there is illustrated a broadband matrix switch for connecting one or all of four outputs represented by the output terminals 10, 12, 14 and 16 to any of four inputs represented by the terminals 18, 20, 22 and 24. The system includes four input distribution cards 26, 28, 30 and 32, and four output selection cards 34, 36, 38 and 40. Each of the input distribution cards is identical and each of the output distribution cards are likewise identical. These modular printed circuit cards are mounted on a motherboard (not shown in FIG. 1, but illustrated in FIGS. 9 through 13). Lines 42 which are mounted on the motherboard interconnect the output terminals of the input cards 26 to 32, with input terminals on the output cards 34 to 40. The input cards each have four cross-point switches 44, 46, 48 and 50. The output cards each have five cross-point switches 52, 54, 58 and 60. These cross-point switches are low capacitance, single-pole double-throw (form c) switches, each with a single movable contact and a pair of fixed contacts. Mercury wetted relay devices which are illustrated in detail in FIG. 6 and 7 are preferred. However, other cross-point or similar switches may be used in practicing the invention. In order to increase the capacity of the switching system (i.e., to add additional inputs and outputs and switching paths) the number of input and output cards may be increased or additional switches may be provided on each of the cards.

A plurality of sources 62, 64, 66 and 68 each having an internal or characteristic output impedance represented by resistors 70, 72, 74 and 76, are connected to the input terminals 18, 20, 22, and 24.

Inasmuch as all of the input distribution cards 26 to 32 are identical and all of the output selection cards 34 to 40 are similarly identical to each other, only the input distribution card 26 and the output distribution card 34 will be described herein in detail. Like parts will be identified with like reference numerals.

Considering the input distribution card 26, the input terminal 78 thereof is connected to the input terminal 18 of the switching system by a transmission line 80. The line 80 is mounted on the motherboard which carries all of the input and output cards 26 through 40. The inputs of the other input distribution cards 28 to 32 have their input terminals connected to the other switching system inputs 20, 22 and 24 by individual transmission lines, also identified by the same reference numeral 80. The transmission lines 80 are, in this embodiment of the invention, coaxial lines, other forms of transmission lines capable of carrying the broadband of frequencies which the switch handles, may also be used. It is a feature of the invention that the lines 80, as well as all other lines in the switching system which have a length which is not negligible as compared to a wave length of the highest frequency of the signals to be handled, have a characteristic impedance equal to the internal impedance of the sources of signal to be switched by the system. This characteristic impedance is also equal to and the same as the characteristic impedance presented by the switch matrix (i.e., at the input terminal of each of the cards, whether it be the input terminal 78 of the input card 26, or any of the four input terminals 82, 84, 86, and 88 of the output cards 34 to 40).

The output terminals 10, 12, 14 and 16 are connected to resistors 90, 92, 94 and 96 which are representative of the load presented by utilization devices for the signals switched by the system. These loads present the same characteristic impedance at the output terminals 10 to 16 which is equal to the characteristic impedance presented at the switching system inputs 18 to 24. Desirably, this characteristic impedance is entirely resistive, in that the entire system from signal source to output load is matched thereby reducing voltage standing wave ration (VSWR) and decreasing differences in output signal level when outputs are connected in parallel to any one of the inputs. The output terminals 10 to 16 are respectively connected to the output terminals 98 of the output select cards 34, 36, 38 and 40. The connection is provided by a transmission line 100 between each of the outputs and a different one of the output terminals 10, 12 14 and 16. These transmission lines 100 may be coaxial lines mounted on the motherboard which carries the cards 26 to 40.

Each input distribution card contains a resistive input distribution network 102 consisting of five resistors 104, 106, 108, 110 and 112 connected to a common node 114. The values of these resistors is desirably identical and selected to be equal to the characteristic impedance which is presented by the transmission lines and at all of the inputs to the switching system. The length of the connections between the resistors 104 to 112 and the node 114 is desirably negligible as compared to a quarter wavelength at the highest signal frequency. It is preferable that the distribution network be made by deposited film techniques mounted on a single substrate in order to provide the short lead lengths discussed above.

One of the resistors 104 of the distribution network is connected by way of a transmission line 113 to the input terminal 78 of the card. The transmission line 113 has the same impedance, namely the characteristic impedance which is presented by the switching system. The line 113 itself is a strip line formed by printed circuit techniques on the card 26. The cards themselves and the strip lines thereon are shown in FIGS. 4 to 7 which will be described hereinafter.

Each of the other four resistors 106, 108, 110 and 112 of the distribution network 102 is connected via separate transmission lines 116, 118, 120 and 122 to the cross points 44, 46, 48 and 50. These transmission lines 116 to 122 are also strip lines which are formed in the card 26 by printed circuit techniques. The cross points are, functionally, single pole double throw switches. The movable contacts thereof are connected to the transmission lines 116 to 122. One of the fixed contacts of each of the switches is connected by way of its respective transmission lines 124, 126, 128 and 130 to the output terminals 132, 134, 136, and 138 of the card. These transmission lines 124 to 130 like the other lines on the card, present the same characteristic impedance which is the characteristic impedance of the source. The other fixed contact on each of the switches are connected by transmission lines 140, 142, 144 and 146 to terminating resistors 148, 150, 152, 154. These resistors are connected to ground, which ground may be the ground plane of the strip lines on the card. The terminating resistors 148 to 154 have values of resistance equal to the characteristic impedance also presented by the other card lines and elements. The use of the terminating resistors 148 to 154 insures that the same characteristic impedance is presented at the input of the card and also at the switching system inputs, notwithstanding which fixed contact the movable contacts of the switches 44 to 50 may be made.

The cross point switches 44 to 50 are preferably low capacitance cross point switches having movable contacts in the form of armatures which are magnetically actuated. These switches are described in detail hereinafter in connection with FIGS. 6 and 7. The switches 44 to 50 are symmetrically arranged around the network 102. Such arrangement is shown schematically in FIG. 2. FIG. 4 also shows the arrangement of the switches on an actual printed circuit card. Such arrangement provides for transmission lines through each switch path of equal lengths as well as for the minimization of path lengths. Cross talk between paths is also minimized by virtue of the symmetrical arrangement. The equalization of the lengths of the transmission lines provides for constant propagation delay of signals which are switched through the input card 26. The physical arrangement of the switches and lines on the card 26 will be discussed in detail hereinafter in connection with FIG. 2 and FIG. 4.

Figure 9:
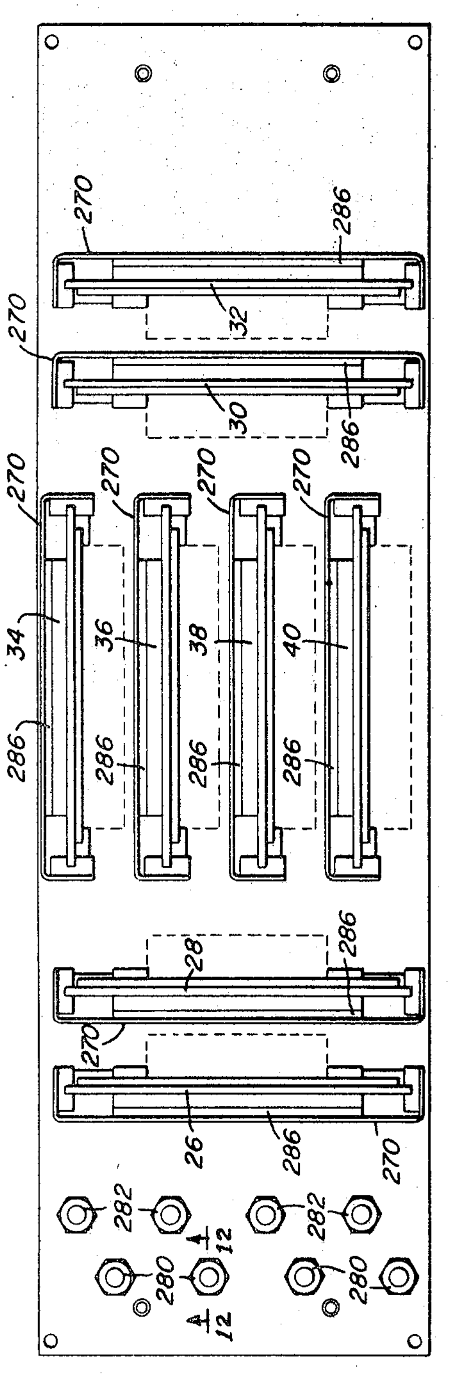
FIG. 9 is a plan view of the matrix switching system shown in FIG. 1 showing the input distribution cards and output selection cards in assembled relationship with a motherboard.
Figure 10:
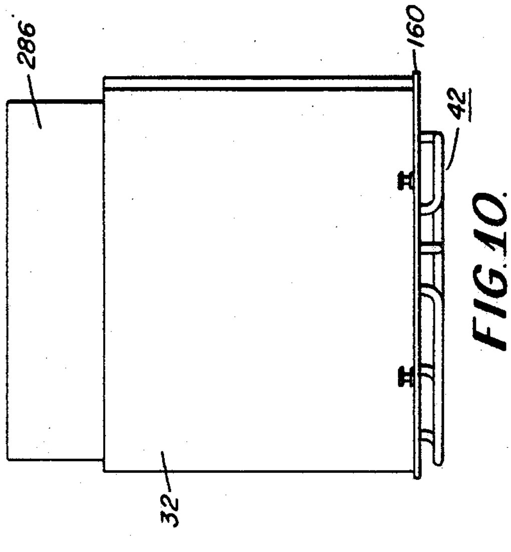
FIG. 10 is an end view of the assembly shown in FIG. 9 as viewed from the right.
Figure 11:
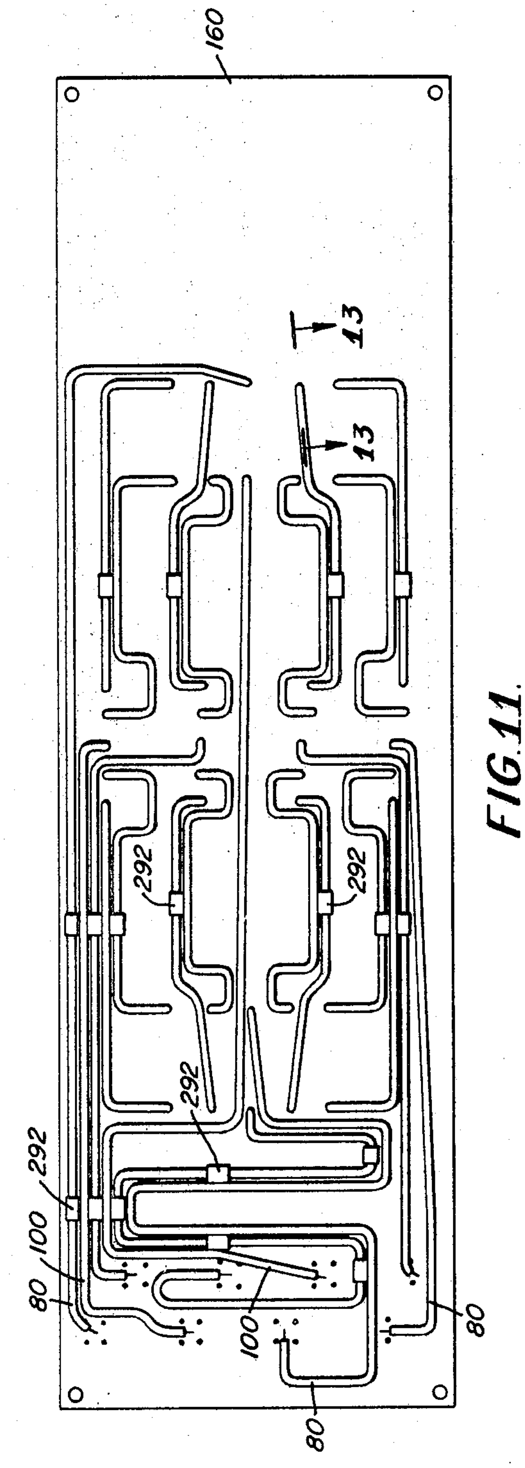
FIG. 11 is a bottom view of the assembly shown in FIGS. 9 and 10.

The input distribution cards 26 to 32 have their output terminals 132 to 138 connected to the input terminals 82 to 88 of the output selection cards 34 to 40 by the interconnecting transmission lines 42 on the motherboard 160 (FIGS. 9 to 11). The input distribution card 26 is connected to each of the output selection cards 34, 36, 38, and 40 by a separate line 162, 164, 166, and 168. Similar lines 162 to 168 interconnect each of the other input distribution cards 28 to 32 to all of the other output distribution cards 34 to 40. Any of the output levels (the term "level" being used in accordance with cross-bar switching terminology, since the outputs appear on the schematic diagram in vertically spaced relationship) can be selected. The cards 34 to 40 may therefore be termed "level selection cards" and the cross points 60 of the cards 34 to 40 may be called "level selection cross points". By virtue of the matrix arrangement of the cross points, any input terminal 18 to 24 may be connected to all of the output terminals 10 to 16. (viz., unlimited paralleling is provided).

The interconnecting lines 162 to 168 may be coaxial cables as illustrated in FIG. 11. Strip lines printed on the motherboard 160 may also provide these interconnecting lines. The lines have the same characteristic impedance as all the other lines heretofore mentioned, which is equal to the characteristic or internal impedance presented by the sources 62 to 68 (viz., the values of the resistors 70 to 76). The lines 152 to 158 are also of equal lengths, thus providing constant propagation delays and uniform phase shift across the band.

Transmission lines 170, 172, 174 and 176 between the input terminals 82 to 88 of the selection cards and the movable contacts of the selection card switches 52 to 58 provide interconnections between the cross points and the interconnecting lines 162 to 168. These lines 172 to 176 are strip lines formed by printed circuit techniques in the output selection cards and have the same characteristic impedance as the other lines in the system. The fixed contacts of the cross points 52 to 58 are connected to short transmission lines stubs 178 and 180, in the case of the switch 52; 182 and 184, in the case of the switch 54, 186 and 188, in the case of the switch 56; and 190 and 192 in the case of the switch 58. These stubs may be short segments of printed circuit strip lines having the length which is negligible with respect to a quarter wave length at the highest frequency which the switching system is expected to handle, (500 MHz in the case of the illustrated system). The stubs 178, 182, 184 and 190 are connected to ground which is provided by a ground plane of the printed circuits which define the strip lines. The stubs 180, 184, 188 and 192 are connected by transmission lines 194 and 196 to the fixed contacts of the level selection cross switch 60. These transmission lines 194 and 196 are strip lines printed in the fabrication of the printed circuit cards 34 to 40, and have the same characteristic impedance as the other transmission lines in the system. The movable contact of the level selection cross points 60 is connected by way of an output transmission line 198 to the output terminal 98 of the output selection card. This line 198, like the others in the system which are contained on the cards, is a strip line having the same characteristic impedance as the other lines. The lines 194 and 196 are of equal lengths, and all corresponding lines on all of the cards are of equal lengths. Accordingly, a constant propagation delay is experienced by any signals as they pass along any of the possible circuit paths in the matrix switching system. The arrangement of the lines, as will be described in greater detail hereinafter in connection with FIGS. 2 and 3, also minimizes unwanted couplings between the circuit paths and enables layout of the equal line lengths, thus contributing to the reduction of WSWR and cross talk in the system.

Figure 2:
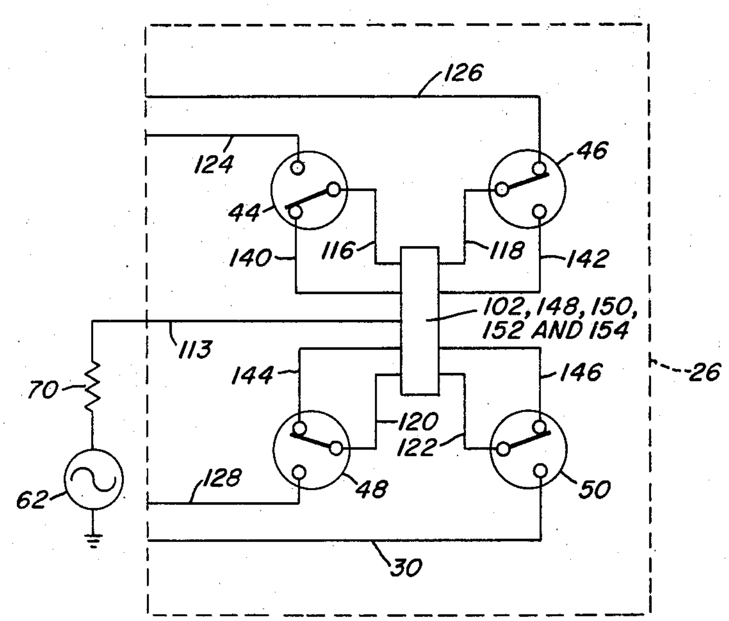
FIG. 2 is a schematic diagram showing the goemetric arrangements of the circuits and switches of one of the input distribution cards used in the system shown in FIG. 1.

Referring to FIG. 2 the geometrical configuration of the typical input distribution card 26 is illustrated. The cross points 44, 46, 48 and 50 are disposed in a symmetrical arrangement around a component which contains the input distribution resistor network 102 and the terminating resistors 148 to 154. These resistors may be deposited film resistors on a common substrate or arranged on substrates which are adjacent to each other. The central location of the resistors provides for minimum lengths for the transmission lines 114 to 130 and 140 to 146. The transmission lines, although not so shown because of the schematic nature of the illustration, are in equal length groupings. The group of transmission lines 116 to 122 between the resistive distribution network 102 and the movable contacts of the switches 44 to 50 are all of equal lengths. Similarly, the lines 140 to 146 between the fixed contacts of the switches and the terminating resistors 148 to 154 are also of equal lengths to each other. Finally, the transmission lines 124 to 130 which connect the outputs of the card to the fixed contact of the switches are also of equal lengths. The arrangement of transmission lines thus provides constant propagation delay from the input (viz., from the source 62) to the free ends of the output transmission lines 124 to 130. The symmetrical arrangement also minimizes overall path lengths thus reducing the possibility of any impedance mismatches in the card. The symmetrical arrangement also reduces cross talk among circuit paths, since the switches 44 to 50 which are the major contributing factors to such cross talk are widely separated from each other.

The transmission lines are fabricated by printed circuit techniques. As will be described in detail more fully hereinafter in connection with FIGS. 4 to 7, the lines themselves are planar printed circuits sandwiched between two printed circuit boards which have conductive areas across substantially their entire surfaces. These outer surfaces constitute ground planes while the circuit paths sandwiched therebetween define conductors of so-called strip line transmission line type. The spacing between the ground planes and the circuits and the dielectric material of the boards are chosen so that the transmission lines have the same characteristic impedance which is equal to the internal or characteristic impedance of the source 62, as represented by the resistor 70.

Figure 3:
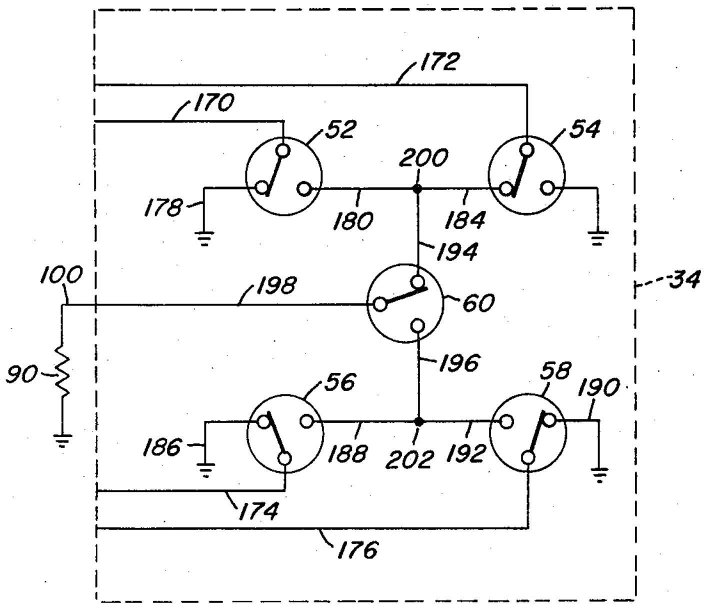
FIG. 3 is a schematic diagram showing the geometric arrangement of the circuits and switches of an output selection card used in the system shown in FIG. 1.

Referring to FIG. 3, the cross points 52 to 58 on the output selection card 34 are symmetrically arranged around the level select cross point 60 for the same reasons and purposes as the arrangement of the input card cross points 44 to 50 about the resistors 102 and 148 to 154. In the case of the output selection card 134 the symmetrical arrangement provides for equal lengths of corresponding transmission lines (viz., the transmission lines 170 to 176, and 194, 196). The arrangement has the additional feature in the case of the output selection card 34 to provide stud lengths of transmission lines which are of minimal lengths, less than a quarter wave-length at the highest operating frequency of the switching system. These stub lengths are represented by the grounding connections 178, 182, 188, and 190, and the connections 180, 184, 186, and 192 to the junctions 200 and 202, which connect the stubs to the fixed contacts of the level selection cross points via the lines 194 and 196. All of the transmission lines are fabricated by printed circuit techniques to provide strip lines of the same type as contained in the input distribution card 26.

The typical input distribution card 26 is illustrated in FIGS. 4 to 7. It consists of a base printed circuit board 206 and a cover printed circuit board 208. A number of circuit components 210, such as transistors, integrated circuits, resistors, and capacitors, are wired to the upper portion of the base board 216. These components define circuitry for operating the magnetic motors or windings which selectively actuate the cross point switches 44 to 50. Inasmuch as the switch operating circuits may be provided in accordance with conventional design techniques, these circuits are not disclosed in detail herein.

The uppr surface of the cover board 208 has a conductive coating 210 which defines one ground plane while the lower surface 212 of the base board 206 has a conductive surface which defines another ground plane. An opening 214 in the cover board 208 allows a component (viz., the thin film circuit encapsulated in a housing) containing the resistors of the distribution network 102 and the terminating resistors 148 to 154 to project therethrough.

The upper surface of the base board 206 has conductive paths 216 printed thereon which define the central conductors of the strip line transmission line. Connections 218 to the circuits as well as to the cross point operating circuits extend to a connector strip 220 located at the bottom of the base board 206.

The cross points themselves are contained in cells 222 which may be glass cylinders. The fixed terminals 224 and 226 extend into the cell and project outwardly in opposite directions from the ends of the cell. Connections 228 and 230 extend from these terminals 224 and 226 to the printed circuit lines 216 which are sandwiched between the boards 206 and 208. The movable contact of the cross point is provided by an armature 232 of magnetic material which is mercury wetted and through the mercury is continuously in sliding contact with a ring 234 which is disposed around the center of the cell and extends into the cell to make the contact with the movable armature 232. The magnetic motor 236 selectively sets up a magnetic field along the axis of the cell 222, in one direction or the other, so as to move the armature into contact with either the fixed contact 226 or the other fixed contact 224. The magnetic motor 236 contains two coils 240 and 242 on a shaft 244 of magnetic material. Three pole pieces 246, 248, and 250 extend downwardly from the shaft and the shaft extends through these pole pieces. Rivet heads 250 and 252 at the ends of the shaft 244 hold the pole pieces 246, 248, and 250 and the coils 240 and 242 in assembled relationship. The central pole piece 248 has a notch 254 through which the cell 222 extends. The other pole pieces 246 and 250 are spaced from opposite ends of the cell 222. By changing the direction of current flow in the coils 240 and 242, thereby selectively energizing either the coil 240 or the coil 242, the armature 232 is actuated into contact with either the fixed contact 224 or the fixed contact 226. The cell 222 itself may be purchased commercially from such sources as Fifth Dimension, Inc., of Princeton, N.J.

In order to minimize the magnetic coupling between the coils of the magnetic motors of the different switches 44 to 50, the axis of the shaft 250 of these switches are disposed at an angle to each other which in the case of the distribution card is, as shown in FIG. 4, 90°.

Output selection card 34 is designed in the same manner as the input distribution card 26. It includes a base printed circuit board 260 on which components 262 for operating the magnetic motors of the switches 52 to 58 are located. A cover board 264 which provides the upper ground plane for the strip line circuit of the card 34 is disposed over the lower half of the base card 260; lower surface of the base card which underlies the cover board 264 also being coated to provide the lower ground plane. The printed circuits which are provided on the base board and are sandwiched between the base board and the cover board, form the strip line transmission line of the output selection card. The cross point switches 52 to 60 of the selection card are identical to the cross point switches used on the input distribution card 34. The axes of these switches are disposed in angular relationship (the axes of the switches 52, 54, and 56, 58 being at 90° to each other) so as to minimize magnetic couplings between the switches. A connector strip 268 which extends from the bottom of the base board 260 carries the connections from the transmission lines in other circuits of the selection card 34.

Figure 13:
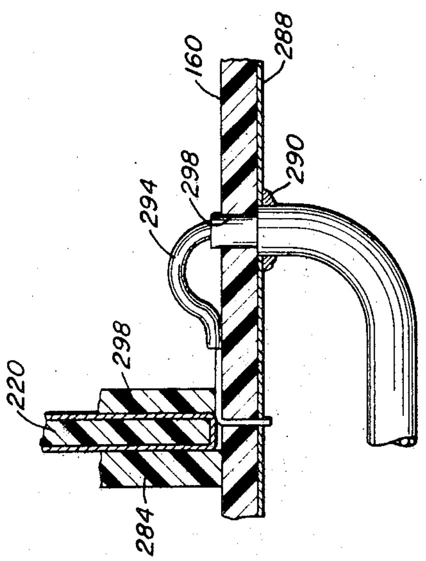
FIG. 13 is a fragmentary sectional view showing connections between a card transmission line and a motherboard transmission line, the section being taken along the line 13—13 in FIG. 11.

The matrix switching system is shown in assembled relationship in FIGS. 9 to 13. Printed card holders 270 mounted on the motherboard 160 slidably receive the input distribution cards 26 to 32 and the output selection cards 34 to 40. The switches and other componentry on the cards are not shown to simplify the illustration. Terminals 280 to which the input sources 62 to 68 may be connected are provided on one end of the card. Next these terminals are similar terminals 282 to which the output loads 90 to 96 may be connected. Connections to the boards 26 to 40 are made by printed circuit connectors which cooperate with the connector strips 220 (FIG. 4) and 226 (FIG. 8). A typical printed circuit connector 284 is illustrated in FIG. 13.

Figure 12:
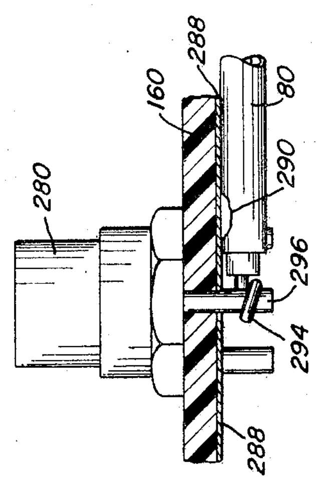
FIG. 12 is a fragmentary sectional view showing connections between a motherboard transmission line and a switching system terminal; the section being taken along the line 12—12 in FIG. 9.

The input distribution cards 26 to 32 are symmetrically arranged with respect to the output selection cards 34 to 40. Two of the input distribution cards 26 and 28 are disposed opposite one end of the selection cards 34 to 40 and the remaining two distribution cards 30 and 32 are disposed on the opposite side of the selection card 34 to 40. The planes of the input distribution cards are also perpendicular to the planes of the output selection cards. This arrangement minimizes cross talk between the circuits on the cards. The card holders 270 also have U-shaped plates 286 of conductive material which provide shielding between adjacent cards, thus also minimizing cross talk. The lines of 42 which interconnect the outputs of the input distribution card with the inputs of the output selection card are located on the under side or bottom of the motherboard 160. The bottom surface of the motherboard is also clad with a layer 288 of conductive material which affords a ground plane to assist in shielding the cards from the connecting line 42. The lines 80 and 100 also on the bottom of the motherboard provide connections between the input distribution cards and the input terminals 280 which correspond to the terminals 18 to 24 (FIG. 1) and the output terminals 282 which correspond to the output terminals 10 to 16 (FIG. 1). These input and output lines 80 and 100 as well as the interconnecting lines 166 are rigid coax cables. As shown in FIGS. 12 and 13 the outer conductors 290 of these cables are connected to the ground plane 288 as by soldering. Sleeving 292 is disposed around different ones of the coaxial cables where they lie adjacent to each other in order to separate the cables from each other.

In order to make connection from the coaxial cable to the terminals, the inner conductor 294 of the terminal is connected as by soldering to a pin 296 which extends downwardly from the body of the conductor 280 (see FIG. 12).

In order to make connections to the printed circuit boards the coaxial cable is, as shown in FIG. 13, extended through the hole 298 provided in the board; the dielectric portion of the cable extending through the hole 298. The inner conductor 294 then extends into the printed circuit connector 284 in the portion thereof which makes contact with the connector strip 220. The inner conductor 294 may be connected to the land portion 298 of the connector 284 to provide tight connection therebetween.

From the foregoing description it will be apparent that there has been provided an improved matrix switching system. While an exemplary 4 × 4 switching system has been described in detail in order to illustrate the invention, variations and modifications thereof within the scope of the invention will undoubtedly suggest themselves to those skilled in the art. Accordingly, the foregoing description should be taken merely as illustrative and not in any limiting sense.

What is claimed is:

1. A switching system which selectively extends a plurality of paths adapted to signals having frequencies from D.C. to ultra high frequency between a plurality of inputs and a plurality of outputs, said system comprising:

a plurality of first printed circuit cards, a plurality of second printed circuit cards, each of said cards having a plurality of switches, means including a plurality of printed circuit transmission lines having a certain characteristic impedance contained in each for said cards and connected to the terminals of the switches thereon, means on said first card providing a common connection between said input and each of the switches thereon, means on said second card including one of said plurality of switches thereon for providing connections between the other of said plurality of switches thereon and said output, a third board on which said first and second boards are mounted, and a plurality of transmission lines on said third board, each of said third board lines having said certain characteristic impedance, and said third board lines being connected at the opposite ends thereof to separate ones of said first card and second card switches each via a separate one of said first board and second board printed circuit transmission lines.

2. The invention as set forth in claim 1 wherein said signals are provided by sources having each presenting a certain output impedance at said inputs.

said certain characteristic impedance being equal to said output impedance.

3. The invention as set forth in claim 2 including loads each connected to a different one of said outputs, said loads each having an impedance equal to said certain characteristic impedance.

4. The invention as set forth in claim 1 wherein said lines on said board are coaxial transmission lines.

5. The invention as set forth in claim 1 wherein said means on said first card which provide said common connection comprise a resistive distribution network having a common mode with resistors extending from said mode separately to said input and to each of said first card switches, the values of said resistors being such that said certain impedance is presented at said input.

6. The invention as set forth in claim 1 wherein separate ones of said transmission lines on said first card extend from each said first card switches to a plurality of separate first card outputs, last named lines being of equal length, wherein separate ones of said transmission lines on said second card extend from a plurality of said second card switches to a plurality of separate first card inputs, said last named lines being of equal length, and wherein said board lines are connected separately between said first card outputs and said second card inputs, each of said last named board lines being of the same length.

7. The invention as set forth in claim 5 wherein said first card switches are equally spaced in symmetrical relationship around said network, and wherein said second card switches are disposed in symmetrical relationship with said one second card switch, said spacing of said first and second card switches providing equal transmission line lengths respectively between said first card switches and the outputs of said first card and said second card switches and the inputs of said second card.

8. The invention as set forth in claim 7 wherein said card switches are each cross-point switches having a movable contact and a pair of fixed contacts, a plurality of terminating resistors on said first cards each connected to a fixed contact of a different one of said first card switches to present said certain impedance thereat, the other of said fixed contacts of said first card switches being connected to a different first card output, and said movable contact being separately connected to different ones of said network resistors.

9. The invention as set forth in claim 8 wherein the movable contact of said one switch is connected to said output and the fixed contacts thereof are connected to one of the fixed contacts of different pairs of the others of said second card switches, the other of the fixed contacts of said other second card switches being connected to ground, and the movable contacts of said other second card switches being separately connected to different ones of said second card inputs.

10. The invention as set forth in claim 1 wherein said switches are cross-point switches including a magnetizable armature which is axially movable to make contact with a different one of a pair of fixed contacts, a magnetic field structure including a coil spaced from said movable contact with pole pieces extending from said coil to provide a magnetic circuit through said movable contact.

11. The invention as set forth in claim 10 wherein said coils are mounted on said card with the axis of adjacent pair of said coils in misalignment with each other.

12. The invention as set forth in claim 1 wherein said cards are mounted on said board with the planes of said first cards, the planes of said second cards and the plane of said board mutually perpendicular to each other.

13. The invention as set forth in claim 12 wherein the planes of said first cards are parallel to each other and the planes of said second cards are parallel to each other.

14. The invention as set forth in claim 13 wherein said first cards are disposed on opposite sides of said second cards.

* * * * *